(12) United States Patent
Bursy et al.

(10) Patent No.: US 11,065,858 B2
(45) Date of Patent: Jul. 20, 2021

(54) APPARATUS AND METHOD FOR BONDING SHEET METAL PARTS TO A LAMINATED CORE

(71) Applicant: voestalpine Automotive Components Dettingen GmbH & Co. KG, Dettingen an der Erms (DE)

(72) Inventors: Heinrich Bursy, Erkenbrechtsweiler (DE); Jochen Kauffmann, Ebersbach (DE)

(73) Assignee: voestalpine Automotive Components Dettingen GmbH & Co. KG, Dettingen an der Erms (DE)

( * ) Notice: Subject to any disclaimer, the term of this patent is extended or adjusted under 35 U.S.C. 154(b) by 0 days.

(21) Appl. No.: 16/345,691

(22) PCT Filed: Oct. 27, 2017

(86) PCT No.: PCT/EP2017/077672
§ 371 (c)(1),
(2) Date: Apr. 26, 2019

(87) PCT Pub. No.: WO2018/078132
PCT Pub. Date: May 3, 2018

(65) Prior Publication Data
US 2019/0291403 A1    Sep. 26, 2019

(30) Foreign Application Priority Data
Oct. 27, 2016 (EP) .................................. 16196109

(51) Int. Cl.
*B32B 38/00*    (2006.01)
*B32B 7/00*    (2019.01)
(Continued)

(52) U.S. Cl.
CPC ............... *B32B 38/04* (2013.01); *B32B 7/12* (2013.01); *B32B 37/12* (2013.01); *B32B 37/18* (2013.01);
(Continued)

(58) Field of Classification Search
CPC ............ B32B 15/08; B32B 7/12; B32B 38/04
See application file for complete search history.

(56) References Cited

FOREIGN PATENT DOCUMENTS

| | | |
|---|---|---|
| EP | 3089335 A1 | 11/2016 |
| JP | S5450919 A | 4/1979 |
| WO | 2014089593 A1 | 6/2014 |

OTHER PUBLICATIONS

Machine translation in English of patent EP 3 089 335 A1; 16 pages, Nov. 2, 2016. (Year: 2016).*

\* cited by examiner

*Primary Examiner* — Linda L Gray

(57) ABSTRACT

An apparatus and method for bonding sheet metal parts to a laminated core in which sheet metal parts are punched from an electrical steel strip, the punched sheet metal parts are stacked and bonded at least integrally to form a plurality of laminated cores, and in order to facilitate the separation of the integrally bonded sheet metal parts into laminated cores, a separating agent is provided at least between two stacked sheet metal parts in that with the punching stage for punching the sheet metal part, the separating agent is both punched from a separating agent support and provided to the sheet metal part. In order to embody the application of a geometrically accurate separating agent in a reproducible and simple way, it is proposed that the separating agent be punched from the sheet-like separating agent support that is supplied below the electrical steel strip.

16 Claims, 4 Drawing Sheets

(51) Int. Cl.
  *B32B 37/00* (2006.01)
  *H02K 15/00* (2006.01)
  *B32B 38/04* (2006.01)
  *B32B 7/12* (2006.01)
  *B32B 37/12* (2006.01)
  *B32B 37/18* (2006.01)
  *B32B 37/26* (2006.01)
  *B32B 38/18* (2006.01)
  *H02K 15/02* (2006.01)

(52) U.S. Cl.
  CPC .......... *B32B 37/26* (2013.01); *B32B 38/1808* (2013.01); *B32B 2037/268* (2013.01); *B32B 2038/042* (2013.01); *B32B 2457/00* (2013.01); *H02K 15/02* (2013.01); *Y10T 156/107* (2015.01); *Y10T 156/1056* (2015.01); *Y10T 156/1062* (2015.01); *Y10T 156/1074* (2015.01); *Y10T 156/1084* (2015.01); *Y10T 156/1085* (2015.01); *Y10T 156/1093* (2015.01)

APPARATUS AND METHOD FOR BONDING SHEET METAL PARTS TO A LAMINATED CORE

FIELD OF THE INVENTION

The invention relates to an apparatus and method for bonding sheet metal parts to a laminated core in which sheet metal parts are punched from an electrical steel strip, the punched sheet metal parts are stacked and bonded at least integrally to form a plurality of laminated cores, and in order to facilitate the separation of the integrally bonded sheet metal parts into laminated cores, a separating agent is provided at least between two stacked sheet metal parts in that in the punching stage for the punching of the sheet metal part, the separating agent is both punched from a separating agent support and provided to the sheet metal part.

BACKGROUND OF THE INVENTION

In order to be able to separate the sheet metal parts, which are pre-glued or even glued at the end, into laminated cores in punch packeting applications, it is known from the prior art (WO2014/089593A1) to provide a separating agent between two of the stacked sheet metal parts in a stacking unit, embodied as a packet brake, of a progressive punching die. This takes place in that before the progressive punching die, a separating agent in the form of a separating film is laminated onto some regions of the electrical steel strip, said separating agent on the punched sheet metal part serving as a separating aid between laminated cores that adjoin one another in the stacking unit. The application of the separating agent disadvantageously requires an exact positioning with regard to the sheet metal part to be separated, which, as the end or beginning of a laminated core, marks the dividing point between the laminated cores in the packet brake. This positioning is comparatively complex from a processing standpoint and requires various control and/or feedback loops in order, for example, to be able to compensate for deviations in the feeding of the electrical steel strip—which is a requirement for obtaining geometrically accurate laminated cores.

JP S54 50919 A has disclosed a packeting of electrical steel sheets in which a band-shaped separating agent support is guided above the electrical steel strip and this is guided together with the electrical steel strip to the punching stage for punching. It is thus possible to punch out a sheet metal part and a separating agent in a single punching step, said separating agent also being bonded to the punched sheet metal part at the same time. The separating agent support disadvantageously sags freely under the punching stage, which poses an obstacle to a geometrically accurate punching of a separating agent and jeopardizes the reproducibility of the method.

According to the intermediate document EP3089335A1, a separating agent is punched from an endless band in the form of a roll. The web-shaped endless band is not processed into either a sheet or leaf:

SUMMARY OF THE INVENTION

The object of the invention, therefore, is to improve a method of the type mentioned at the beginning in such a way that the application of a geometrically accurate separating agent can take place in a reproducible way. In addition, the application of a separating agent should be easy to manage.

The invention attains the stated object with regard to the method in that the separating agent is punched from the sheet-like separating agent support that is supplied below the electrical steel strip.

If the separating agent is punched from the sheet-like separating agent support that is supplied below the electrical steel strip, then first of all, it is possible to specify a solution for applying a separating agent to a sheet metal part that is simple from a processing standpoint because the punching of the electrical steel strip makes it possible to prevent a sagging of separating agent support. In particular, however, this invention is distinguishable from the prior art because the guidance of the separating agent support below the electric electrical steel strip makes it possible to ensure a dimensionally accurate punching of the separating agent. To be precise, during the punching, the separating agent support can be clamped by the exertion of compressive load on the electrical steel strip and can thus be punched together with the sheet metal part in a geometrically accurate fashion by the punching stage. The shifting of the application of the separating agent to a position below the electrical steel strip can thus decouple the method from potentially existing tolerances in the guidance of the separating agent support, making it possible to ensure a particularly high reproducibility despite a comparatively simple operation of the method. Laminated cores of this kind, particularly laminated cores composed of electrical steel, are thus suitable for electric machines and for electrical and/or electromagnetic applications.

In general, it should be noted that the electrical steel strip can be a semifinished product composed of steel, which can, for example, be a cold-rolled, non-grain-oriented electrical steel strip in the finally annealed state (DIN EN10106) or a grain-oriented electrical steel strip in the finally annealed state (DIN EN11007).

In addition, it is generally noted that the supporting material of the sheet-like separating agent support can contain plastic, fabric, paper, baking parchment, or a combination thereof with or without a coating. The sheet-like separating agent support can, for example, be embodied as a sheet that is detached from a supply roll for example by means of a perforation or to be more precise, can thus be understood to be a leaf having a plurality of sheets or to be a single sheet, for example in the form of a sheet-like film. The sheet-like separating agent support is thus embodied either as a leaf with a plurality of sheets or as a single sheet, for example in that this sheet-like separating agent support is detached from an endless band in roll form. In general, however, it is conceivable to use any form and/or any material from which a separating agent can be punched and which facilitates the separation of the integrally bonded sheet metal parts into laminated cores, for example by reducing the adhesion to at least one of the sheet metal parts adjoining the separating agent. For this purpose, it is conceivable for example, to provide a non-stick coating on at least one flat surface of the separating agent support and/or of the separating agent.

This reproducibility can be retained even if the sheet metal parts are progressively punched from the electrical steel strip since, as mentioned above, according to the invention, the preceding method steps cannot influence an accurately positioned application of the separating agent to the sheet metal parts.

Preferably, prior to the punching, the electrical steel strip is at least partially coated with a curable polymer adhesive layer in order to facilitate the integral bonding of the sheet metal parts into dimensionally stable laminated cores. An in particular heat-hardened baked varnish coating can be especially suitable as the adhesive layer. In general, it should be noted that the adhesive layer can be provided on one side or preferably on both sides of the flat surface of the electrical steel strip.

Preferably, the separating agent is applied to the adhesive layer of the sheet metal part in order to affix it to the sheet metal part after the punching. It is thus possible to ensure a correct guidance of the separating agent during the stacking of the sheet metal parts. This can be particularly advantageous if the laminated cores have segmented layers composed of multiple sheet metal parts and the laminated cores have to be moved or rotated during the stacking of the sheet metal parts. The separating agents that are affixed to the sheet metal part in the manner according to the invention can follow this movement in a reliable way—which can further increase the reproducibility of the method.

If the infeed directions of the sheet-like separating agent support and electrical steel strip in the punching stage extend in an inclined fashion, particularly in a normal orientation, relative to each other, then it is possible to separate the guidance of the separating agent support from that of the electrical steel strip and to thus further simplify the operation of the method.

This geometrical accuracy of the separating agent can be further increased if the electrical steel strip and the sheet-like separating agent support are held down together during the punching.

A possible adhesion of the separating agent support to the electrical steel strip, for example at its die-cutting burr, can be simply released if after the punching, the electrical steel strip is lifted away from the sheet-like separating agent support. It is thus possible for the risk of a tearing of the separating agent support to be reduced, which can increase the reproducibility of the method.

After the separation of the laminated cores, in order remove the separating agent from the laminated core in a simple way, it is possible for the separating agent support to be provided with a non-stick coating. This non-stick coating can also promote the simple separation of the laminated cores.

If the sheet-like separating agent support is cut out to match the contour of the sheet metal part before the punching of the separating agent, then it is possible to ensure a high dimensional accuracy of the separating agent. It is thus also conceivable, for example, to allow the separating agent to remain adhered to the laminated core and to use it, for example, to protect the laminated core.

The operation of the method can be further facilitated if the separating agent support is embodied as a sheet or leaf.

Another stated object of the invention is to modify the design of an apparatus for bonding sheet metal parts to a laminated core in such a way that an application of a geometrically accurate separating agent can take place in a stable fashion in order to be able to produce geometrically accurate laminated cores. In addition, the apparatus should be embodied in a simply designed way.

The invention attains the stated object with regard to the apparatus in that the sheet-like separating agent support is supplied to the punching stage below the electrical steel strip.

Because the sheet-like separating agent support is supplied to the punching stage below the electrical steel strip, by contrast with the prior art, it is possible to ensure that a geometrically accurate separating agent is always punched from the separating agent support and as a result, the stacked sheet metal parts can be separated into dimensionally accurate laminated cores. In addition, such a supply of the separating agent support can be achieved in a simply designed way, particularly so that it is not necessary to take into account the guidance of the electrical steel strip. It is thus also possible to produce a particularly stable apparatus.

If the infeed directions of the electrical steel strip and the sheet-like separating agent support in the punching stage extend in an inclined fashion, particularly in a normal orientation, relative to each other, then it is possible to further reduce the design complexity that is required to obtain a separate guidance of the electrical steel strip and separating agent support.

The design of the apparatus can be further simplified if the sheet-like separating agent support is a sheet or leaf.

Furthermore, the separating agent can be punched from the separating agent support, which is guided below the electrical steel strip, in a geometrically accurate manner if the punching stage has a hold-down device, said hold-down device being fastened to a blade of the punching stage for the combined punching of the separating agent and sheet metal part.

BRIEF DESCRIPTION OF THE DRAWINGS

The subject of the invention is shown by way of example in the figures based on an embodiment variant. In the drawings.

DETAILED DESCRIPTION OF THE PREFERRED EMBODIMENTS

Figure 1:
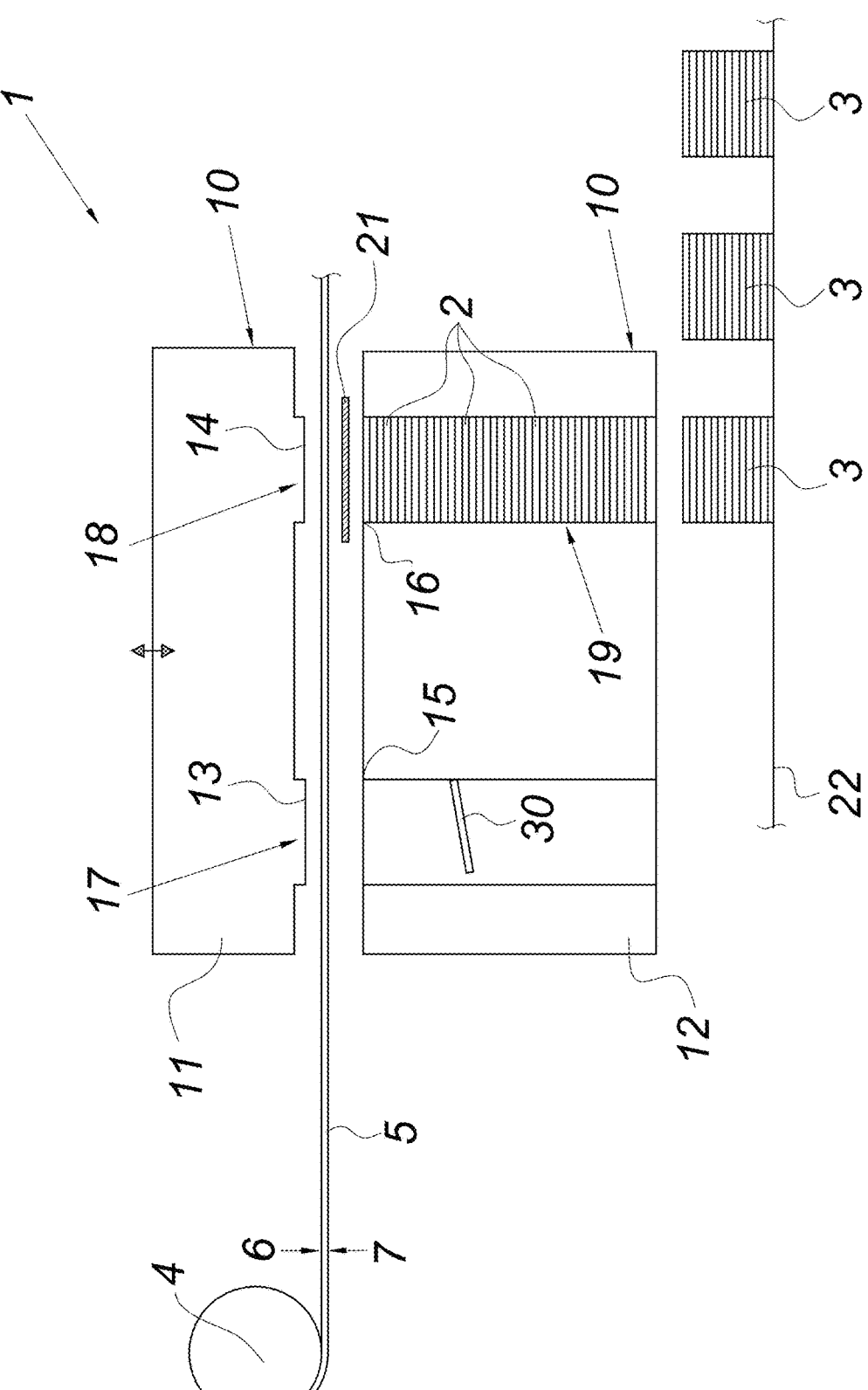
FIG. 1 shows a schematic view of an apparatus for producing laminated cores.
Figure 3:
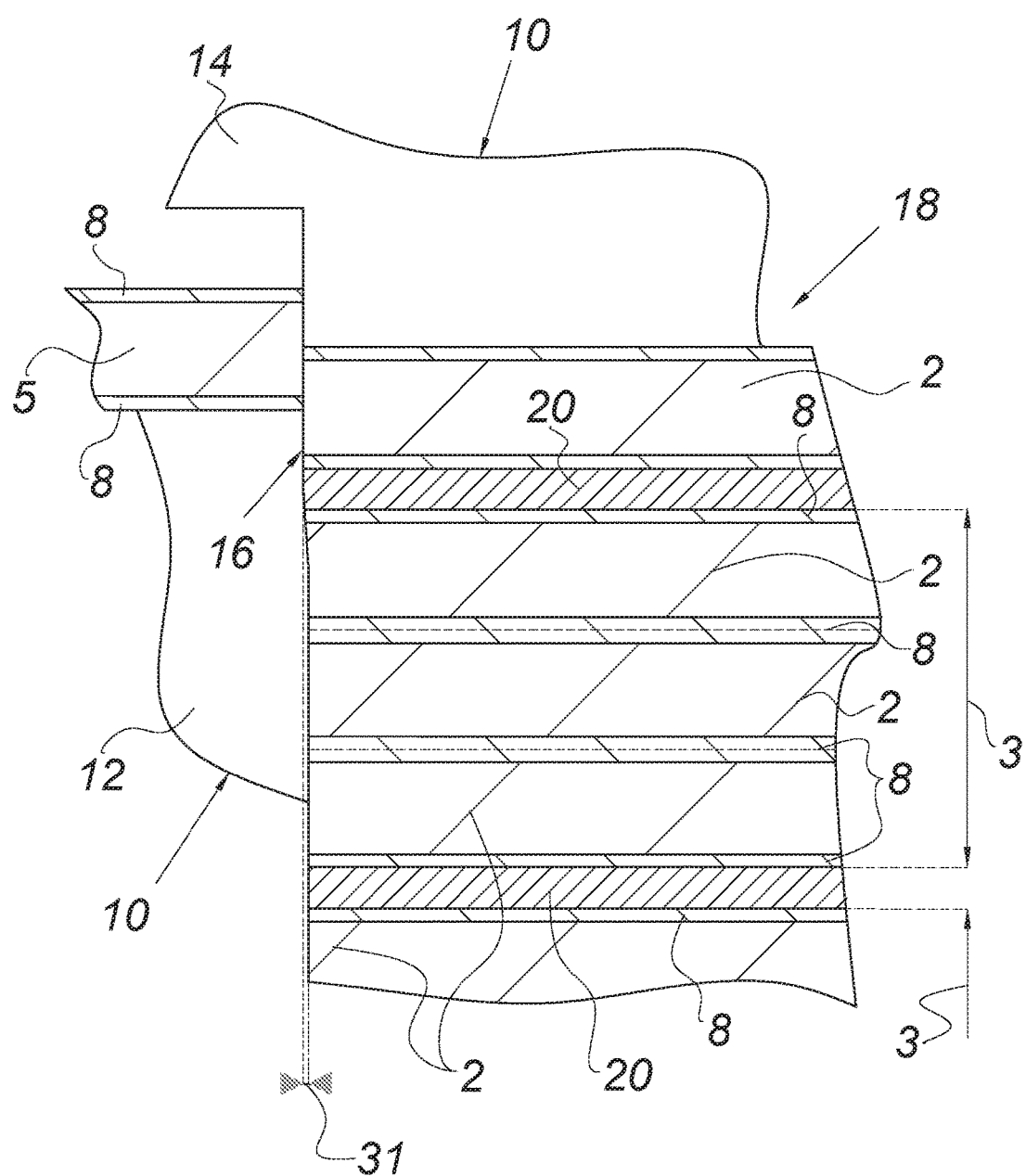
FIG. 3 shows a cut-away detail view of the packet brake from FIG. 1.

The exemplary embodiment in FIG. 1 schematically depicts an apparatus 1 for carrying out the method according to the invention. This apparatus 1 is used for packeting punched sheet metal parts 2 into laminated cores 3. To this end, an electrical steel strip 5 is unwound from a coil 4, which strip has a polymer plastic layer 8, namely a heat-hardened baked varnish, covering the entirety of both sides 6, 7 of the band, which plastic layer 8 is visible, for example, in FIG. 3. Multiple sheet metal parts 2 are punched from the baked varnish-coated electrical steel strip 5 with the aid of a progressive punching die 10. Such a punching—it should be generally noted—can be a cutting-out, a cutting-off, an uncoupling, trimming, dividing by squeezing, etc.

As can also be inferred from FIG. 1, the punching tool 10, for example a progressive punching die in this case, performs a cutting with multiple strokes in which its upper tool 11 cooperates with its lower tool 12. With a first blade 13 of the upper tool 11, the electrical steel strip 5 is pre-processed for a punching, after which with a second blade 14 of the upper tool 11 punches and thus separates the sheet metal part 2 from the electrical steel strip 5. To this end, the blades 13, 14 cooperate with the respective matrices 15, 16 of the lower tool 12 and thus constitute two punching stages 17, 18 in the punching tool 10.

Such a progressive cutting is recognizable in FIG. 1 from the fact that in the pre-processing, a part 30 is cut from the electrical steel strip 5 in order to prepare the electrical steel strip 5 for the punching of the sheet metal part 2. Then, the sheet metal parts 2 are punched with the aid of the punching stages 18, and, through the pressure of the upper tool 11, are pushed into and stacked in a stacking unit 19, which has a partially tapering guide 31 in the lower tool 12. This guide 31 in the lower tool performs the function of a packet brake on the sheet metal parts 2, as a result of which the sheet metal parts 2, through the pressure of the upper tool 11 and with the aid of the polymer plastic layer 8 that is present between the sheet metal parts 2, undergo a firm physical and/or chemical bonding. In general, it should be noted that the stacking unit 19 can also be actively heated in order to improve the integral bonding of the sheet metal parts 2.

Furthermore, the laminated cores 3 can also undergo hardening steps that are not shown in detail in order to strengthen the integral bonding between the sheet metal parts 2. Also not shown in detail is the option of rotating the stacking unit 19 in order, for example, to form segmented laminated cores 3 of layers that contain multiple sheet metal parts 2 that are placed next to and stacked on top of one another. In general, it should be noted that—in a manner that is not shown—as an alternative to the tapering, it is also conceivable to provide a bucking bar in the guide, which exerts a corresponding resistance for the integral bonding of the sheet metal parts 2.

Figure 2:
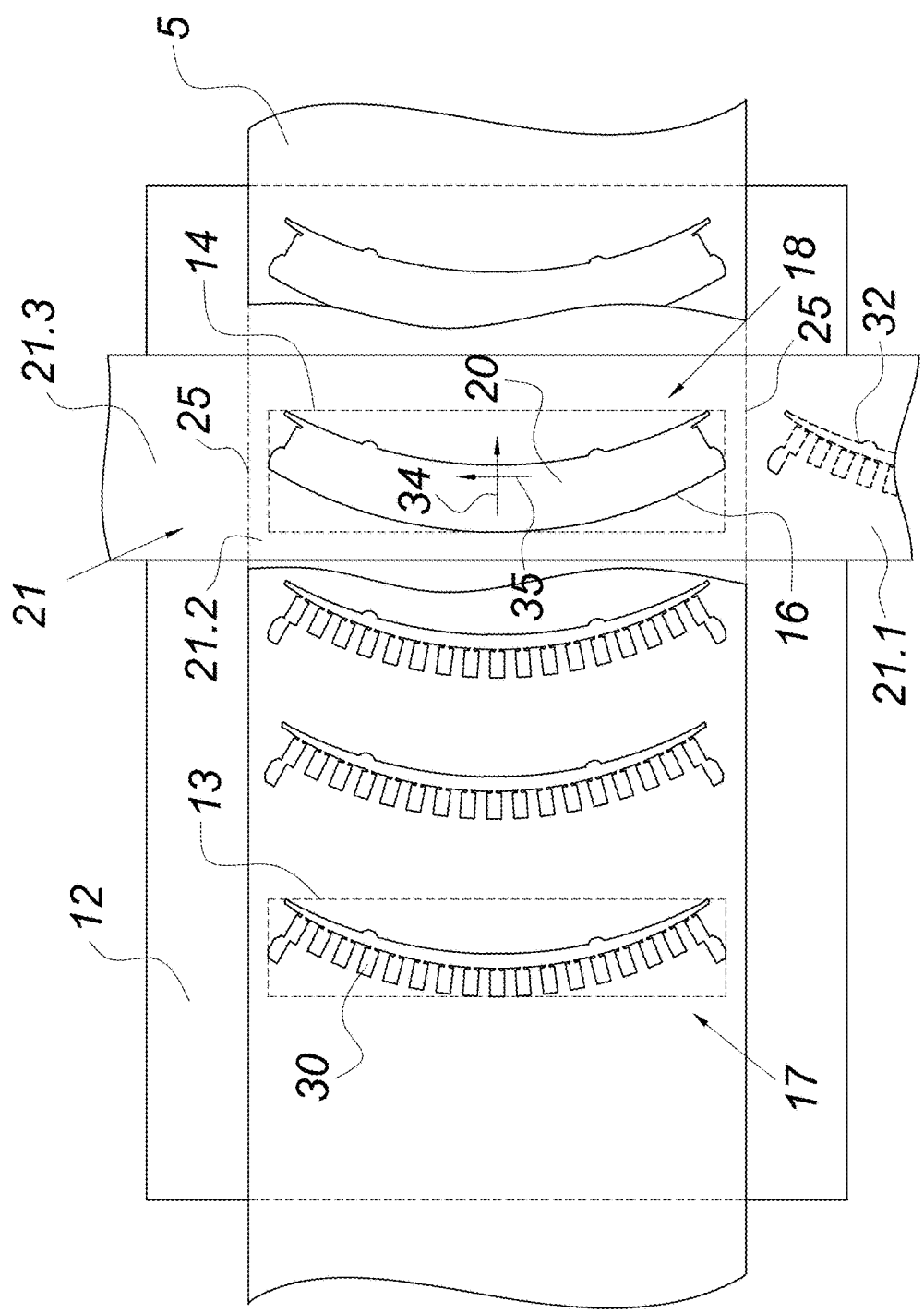
FIG. 2 shows a top view of the progressive punching die of the apparatus according to FIG. 1.
Figure 4:
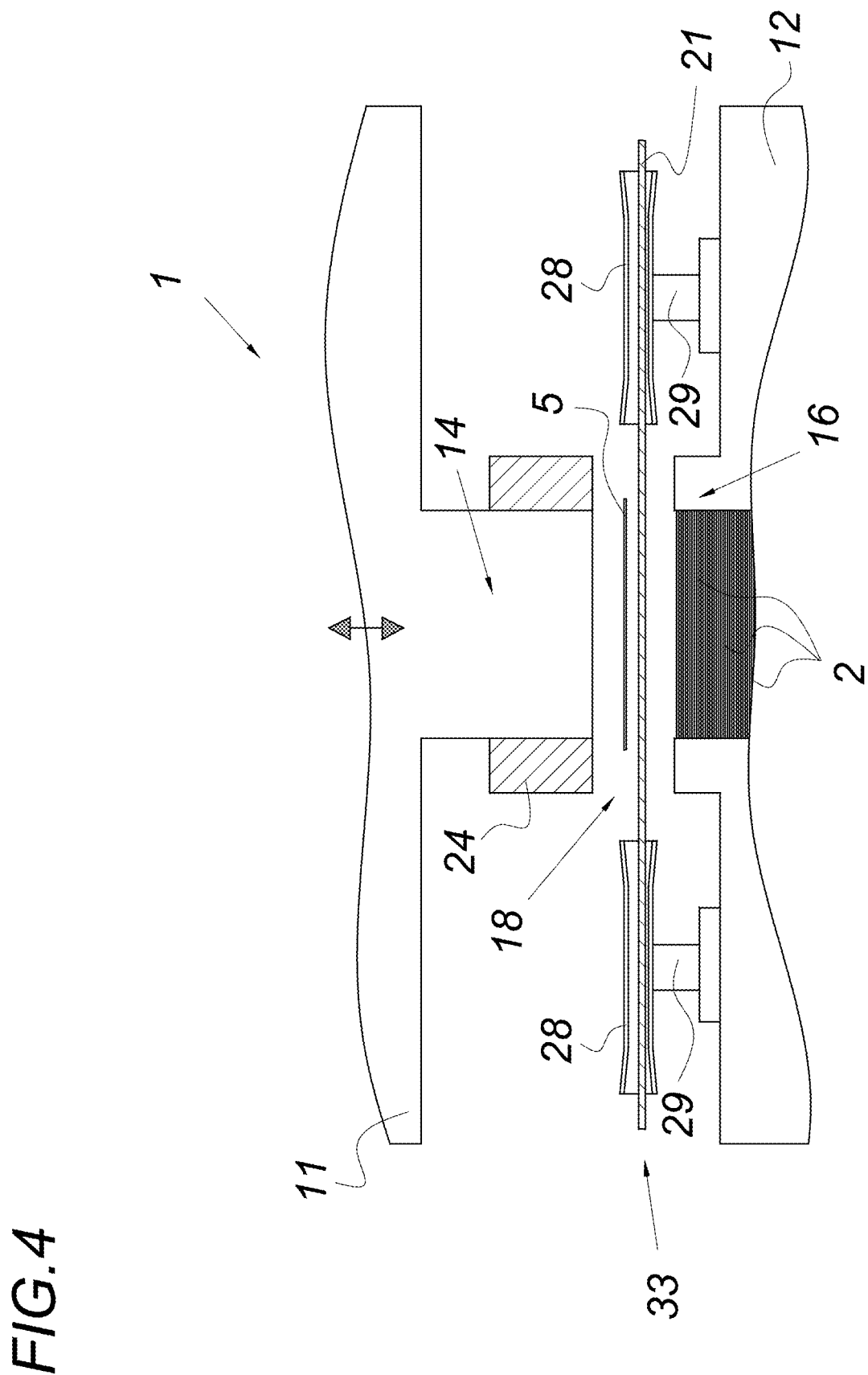
FIG. 4 shows a cut-away side view of the punching stage of the apparatus according to FIG. 1.

In order to be able to separate laminated cores 3 that are exiting the stacking unit 19 more easily from one another, a supply device 33 provides a separating agent 20 at least between two stacked sheet metal parts 2, which separating agent is visible, for example, in FIGS. 2 and 4. This is performed with the aid of the punching stage 18 that is used for punching the separating agent 20 from a separating agent support 21—as is shown in detail by FIG. 2 in a top view of the lower tool 12 of the punching tool 10.

To do so, the blade 14 depicted with dashed lines in FIG. 2 first presses against the electrical steel strip 5 and subsequently against the separating agent support 21 and in cooperation with the matrix 16 of the lower tool 12, punches out both the sheet metal part 2 and the separating agent 20. Thus according to the invention, the separating agent 20 is punched from the separating agent support 21 that is supplied under the electrical steel strip 5 and that is also embodied in sheet-like fashion.

Through this supplying of the sheet-like separating agent support 21 in the manner according to the invention, the latter is advantageously held down by the compressive load exerted on the electrical steel strip 5 by the blade 14 during the punching, which ensures a dimensionally accurate punching of the separating agent 20. As a result, the application of a geometrically accurate separating agent 20 on the punched sheet metal part 20 can be performed in a reproducible manner.

The sheet-like separating agent support 21 can, for example, consist of multiple sheets 21.1, 21.2, 21.3 and can thus be embodied as a leaf; these sheets 21.1, 21.2, 21.3 can connected to one another by means of a perforation 25 and can thus optionally be supplied as connected sheets 21.1, 21.2, 21.3 to the punching stage 18, as indicated by way of example in FIG. 2. The sheet-like separating agent support 21 is thus format-specific and defined. Worn out sheets 21.1, 21.2, 21.3 can be ejected on one side of the guide.

It is also conceivable to pull the sheet-like separating agent support 21 or also individual sheets 21.1, 21.2, or 21.3 forward and back in order to thus load the punching stage 18 with separating agent 20 as needed or in other cases, to keep it free of the separating agent support 21. The separating agent support 21 can, for example, be embodied in the form of a silicone-coated baking parchment.

In addition, this punching also places the separating agent 20 onto the punched sheet metal part 2 or more precisely, onto its plastic layer 8 in a reproducible manner and conveys it into the stacking unit 19. With a subsequent other punched sheet metal part 2, this separating agent 20 functions as the dividing point between the adjoining sheet metal parts 2. Consequently, the separating agent 20 is also situated between two sheet metal parts 2 in the stacking unit 19, a structural embodiment that is visible, for example, in FIG. 3 below the fully depicted laminated core 3, which also includes the sheet metal part 2 that has just been punched by the punching stage 18. It is thus possible to achieve a reliable separation of the stacked and integrally bonded sheet metal parts 2 into precise laminated cores 3—particularly even in cases in which the sheet metal parts 2 exit from the stacking unit 19 and are provided, for example, onto a conveyor belt 22 for further transport.

According to FIG. 2, a separating agent 20 is punched from the separating agent support 21, which entirely matches the negative outer contour of the punched sheet metal part 2. But it is also conceivable, as indicated with dashed lines on the separating agent support 21 in FIG. 2, to already begin cutting an opening 32 into the separating agent support 21 before it is supplied to the punching stage 18. As a result, the punching stage 18 punches a separating agent 20 that matches the contour of the sheet metal part 2 and does not protrude out from it even after being mounted. This is particularly advantageous with inner contours on the laminated core 3, which are subsequently also not covered by the separating agent 20. It is therefore also conceivable, for example, to allow the separating agent 20 to adhere to a laminated core 3 and remain there. Naturally, it is also conceivable to remove the separating agent 20 from the laminated core 3, which can be facilitated by means of a separating agent 20 provided with a non-stick coating (e.g.: double-sided silicone-coated baking parchment).

As is apparent in FIG. 4, in the punching stage 18, the separating agent support 21 is guided by the supply device 33 below the electrical steel strip 5 and is punched there. To accomplish this, a hold-down device 24 that is fastened to the blade 14 holds the electrical steel strip 5 and the separating agent support 21 down together. The separating agent support 21 is supplied to the punching stage 18 by the guide elements 28. Because these guide elements 28 are supported on guide columns 29, after the punching, the separating agent support 21 can be lifted away from the electrical steel strip 5 in order to release any adhesion of the separating agent support 21 to the electrical steel strip 5. The separating agent support 21 therefore does not suffer any damage—for example due to the presence of die-cutting burrs that are not shown in detail —on the electrical steel strip 5.

As can also be inferred from FIG. 2, the infeed directions 34, 35 of the electrical steel strip 5 and the separating agent support 21 in the punching stage 18 extend in an inclined fashion, preferably in a normal orientation, relative to one another. It is thus possible for the supply of the separating agent support 21 to the punching stage 18 in this connection to be embodied in a simply designed way.

The invention claimed is:

1. A method for bonding sheet metal parts to a laminated core, comprising:
punching sheet metal parts from an electrical steel strip;
stacking the punched sheet metal parts to form a stack of sheet metal parts;
providing a separating agent at least between two of the stacked sheet metal parts from the electrical steel strip by way of a punching stage for punching at least one of the sheet metal parts, wherein the separating agent is both punched from a separating agent support supplied below the electrical strip and provided to the at least one sheet metal part, and wherein the separating agent support is in a form of a sheet or leaf;

integrally bonding the stacked sheet metal parts having the separating agent between at least two of the stacked sheet metal parts; and separating the stack of integrally bonded sheet metal parts into a plurality of laminated cores.

2. The method according to claim 1, comprising progressively punching the sheet metal parts from the electrical steel strip.

3. The method according to claim 1, further comprising, prior to the punching, at least partially coating the electrical steel strip with a curable polymer adhesive layer.

4. The method according to claim 3, comprising applying the separating agent to the adhesive layer of the sheet metal part.

5. The method according to claim 1, wherein infeed directions of the separating agent support and electrical steel strip in the punching stage extend in a non-parallel fashion relative to each other.

6. The method according to claim 1, wherein the electrical steel strip and the separating agent support are held down together during the punching.

7. The method according to claim 1, comprising, after the punching, lifting the electrical steel strip away from the separating agent support.

8. The method according to claim 1, comprising providing the separating agent support with a non-stick coating.

9. The method according to claim 1, comprising cutting out the separating agent support to match a contour of the sheet metal part before the punching of the separating agent.

10. The method according to claim 1, wherein the separating agent support comprises a material with or without a coating, wherein the material is selected from the group consisting of: plastic, film, fabric, paper, baking parchment, and combinations thereof.

11. An apparatus for bonding sheet metal parts to a laminated core, comprising:

a punching tool that has a punching stage for punching a sheet metal part from an electrical steel strip;

a stacking unit for stacking and at least integrally bonding the punched sheet metal parts to form a stack comprising integrally bonded sheet metal parts, and having a supply device for providing a separating agent between at least two sheet metal parts that are stacked in the stacking unit in order to facilitate a separation of the integrally bonded sheet metal parts into a plurality of laminated cores with the separating agent being part of the integrally bonded sheet metal parts, wherein the supply device has a separating agent support in a form of a sheet or leaf, and the supply device supplies the separating agent support to the punching stage below the electrical steel strip in such a way that with the punching stage, the separating agent is both punched from the separating agent support and provided to the sheet metal part.

12. The apparatus according to claim 11, wherein infeed directions of the electrical steel strip and the separating agent support in the punching stage extend in a non-parallel fashion relative to each other.

13. The apparatus according to claim 11, wherein the separating agent support comprises a material with or without a coating, wherein the material is selected from the group consisting of: plastic, film, fabric, paper, baking parchment, and combinations thereof.

14. The apparatus according to claim 11, wherein the punching stage has a hold-down device fastened to a blade of the punching stage, wherein the hold-down device holds the electrical steel strip and the separating agent support down together for a combined punching of the separating agent and sheet metal part.

15. The method according to claim 1, wherein infeed directions of the separating agent support and electrical steel strip in the punching stage extend in a normal orientation relative to each other.

16. The apparatus according to claim 11, wherein infeed directions of the electrical steel strip and the separating agent support in the punching stage extend in a normal orientation relative to each other.

\* \* \* \* \*

UNITED STATES PATENT AND TRADEMARK OFFICE
CERTIFICATE OF CORRECTION

| | | |
|---|---|---|
| PATENT NO. | : 11,065,858 B2 | Page 1 of 1 |
| APPLICATION NO. | : 16/345691 | |
| DATED | : July 20, 2021 | |
| INVENTOR(S) | : Heinrich Bursy et al. | |

It is certified that error appears in the above-identified patent and that said Letters Patent is hereby corrected as shown below:

In the Specification

Column 2, Line 35, "DIN EN11007" should read --DIN EN10107--.

Signed and Sealed this
Twenty-fifth Day of October, 2022

Katherine Kelly Vidal
*Director of the United States Patent and Trademark Office*